US010635060B2

(12) United States Patent
Leal et al.

(10) Patent No.: US 10,635,060 B2
(45) Date of Patent: Apr. 28, 2020

(54) SYSTEMS AND METHODS FOR VARIABLE CONTROL AND OPERATION OF HVAC COMPONENTS

(71) Applicant: Lennox Industries LLC, Richardson, TX (US)

(72) Inventors: Rosa Maria Leal, Irving, TX (US); Alan Edens Bennett, Denton, TX (US); Krag Wilson Mercer, The Colony, TX (US); Farhad Nick Abrishamkar, Arlington, TX (US)

(73) Assignee: Lennox Industries LLC, Richardson, TX (US)

( * ) Notice: Subject to any disclaimer, the term of this patent is extended or adjusted under 35 U.S.C. 154(b) by 0 days.

(21) Appl. No.: 16/433,211

(22) Filed: Jun. 6, 2019

(65) Prior Publication Data

US 2019/0286084 A1    Sep. 19, 2019

Related U.S. Application Data

(63) Continuation of application No. 15/058,508, filed on Mar. 2, 2016, now Pat. No. 10,338,546.

(51) Int. Cl.
*G05B 15/02* (2006.01)
*G05D 23/19* (2006.01)
*F24F 11/30* (2018.01)
*F24F 11/62* (2018.01)

(52) U.S. Cl.
CPC ............. *G05B 15/02* (2013.01); *F24F 11/30* (2018.01); *F24F 11/62* (2018.01); *G05D 23/19* (2013.01)

(58) Field of Classification Search
CPC .................................. G05B 15/02; F24F 11/62
USPC ........................................... 800/276; 700/276
See application file for complete search history.

(56) References Cited

U.S. PATENT DOCUMENTS

| 7,890,215 | B2 | 2/2011 | Duncan |
| 8,630,741 | B1 | 1/2014 | Matsuoka et al. |
| 2009/0254222 | A1* | 10/2009 | Berman ............... E06B 9/322 700/275 |
| 2015/0051741 | A1* | 2/2015 | Bruck ................. F24F 11/30 700/276 |

(Continued)

*Primary Examiner* — Bo Fan
(74) *Attorney, Agent, or Firm* — Winstead PC

(57) ABSTRACT

A method of controlling operations of an HVAC system includes measuring temperature within an enclosed space, receiving a setpoint temperature within the enclosed space, calculating a temperature difference between the measured temperature and the received setpoint temperature, and determining whether the temperature difference between the measured temperature and the received setpoint temperature is greater than or equal to a first predetermined temperature differential value. If the temperature difference between the measured temperature and the received setpoint temperature is greater than or equal to the first predetermined temperature differential value, determining whether the temperature difference between the measured temperature and the received setpoint temperature is greater than or equal to a second predetermined temperature differential value. If the temperature difference between the measured temperature and the received setpoint temperature is less than the second predetermined temperature differential value, selecting a first operating mode of a plurality of operating modes of the HVAC system.

19 Claims, 4 Drawing Sheets

(56) References Cited

U.S. PATENT DOCUMENTS

2015/0362205 A1* 12/2015 Hung ................... F25B 49/02
                                                                                              454/238
2015/0372539 A1* 12/2015 Livadaras ............. G05B 15/02
                                                                                              700/297

* cited by examiner

SYSTEMS AND METHODS FOR VARIABLE CONTROL AND OPERATION OF HVAC COMPONENTS

CROSS REFERENCE TO RELATED APPLICATIONS

This application is a continuation of U.S. patent application Ser. No. 15/058,508, filed on Mar. 2, 2016. U.S. patent application Ser. No. 15/058,508 is incorporated herein by reference

FIELD OF THE INVENTION

The present invention relates generally to systems and methods that provide variable control and operation, and more particularly, but not by way of limitation, to providing flexible control and operation of at least one of blowers and compressors in heating, ventilation, and air conditioning (HVAC) systems.

BACKGROUND OF INVENTION

A Variable-Air-Volume (VAV) system is a type of HVAC system that varies airflow that can vary temperature. Advantages of VAV systems may include, for example, precise temperature control, reduced compressor wear, lower energy consumption by system fans, less fan noise, and increased passive dehumidification.

However, VAV systems, such as a single-zone VAV system, cannot be controlled with a generic controller such as, for example, an electronic thermostat module. Such single-zone VAV systems only operate with an original equipment manufacturer (OEM) specific integrated controller or Building Automation Systems controller using communication protocols such as, for example, BACnet. As such, users of VAV type HVAC systems must use one of the aforementioned OEM specific integrated controller or Building Automation Systems controller. Exemplary systems and methods discussed herein provide users with an ability to utilize the features of VAV type HVAC systems using controllers other than the OEM specific integrated controller or Building Automation Systems controller.

SUMMARY OF INVENTION

A method of controlling operations of a heating, ventilation, and air conditioning (HVAC) system. The method includes measuring, using a controller, temperature within an enclosed space, receiving, using the controller, a setpoint temperature within the enclosed space, calculating, using the controller, a temperature difference between the measured temperature and the received setpoint temperature, and determining, using the controller, whether the temperature difference between the measured temperature and the received setpoint temperature is greater than or equal to a first predetermined temperature differential value. Responsive to a determination that the temperature difference between the measured temperature and the received setpoint temperature is greater than or equal to the first predetermined temperature differential value, determining, using the controller, whether the temperature difference between the measured temperature and the received setpoint temperature is greater than or equal to a second predetermined temperature differential value. Responsive to a determination that the temperature difference between the measured temperature and the received is less than the second predetermined temperature differential value, selecting, using the controller, a first operating mode of a plurality of operating modes of the HVAC system.

A heating, ventilation, and air conditioning (HVAC) system includes a controller and an interface configured to communicate with the controller. The controller is configured to measure temperature within an enclosed space, receive a setpoint temperature within the enclosed space, calculate a temperature difference between the measured temperature and the received setpoint temperature, and determine whether the temperature difference between the measured temperature and the received setpoint temperature is greater than or equal to a first predetermined temperature differential value. Responsive to a determination that the temperature difference between the measured temperature and the received setpoint temperature is greater than or equal to the first predetermined temperature differential value, determine, whether the temperature difference between the measured temperature and the received setpoint temperature is greater than or equal to a second predetermined temperature differential value. Responsive to a determination that the temperature difference between the measured temperature and the received is less than the second predetermined temperature differential value, select, a first operating mode of a plurality of operating modes of the HVAC system.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein.

DETAILED DESCRIPTION

Embodiment(s) of the invention will now be described more fully with reference to the accompanying Drawings. The invention may, however, be embodied in many different forms and should not be construed as limited to the embodiment(s) set forth herein. The invention should only be considered limited by the claims as they now exist and the equivalents thereof.

Figure 1:
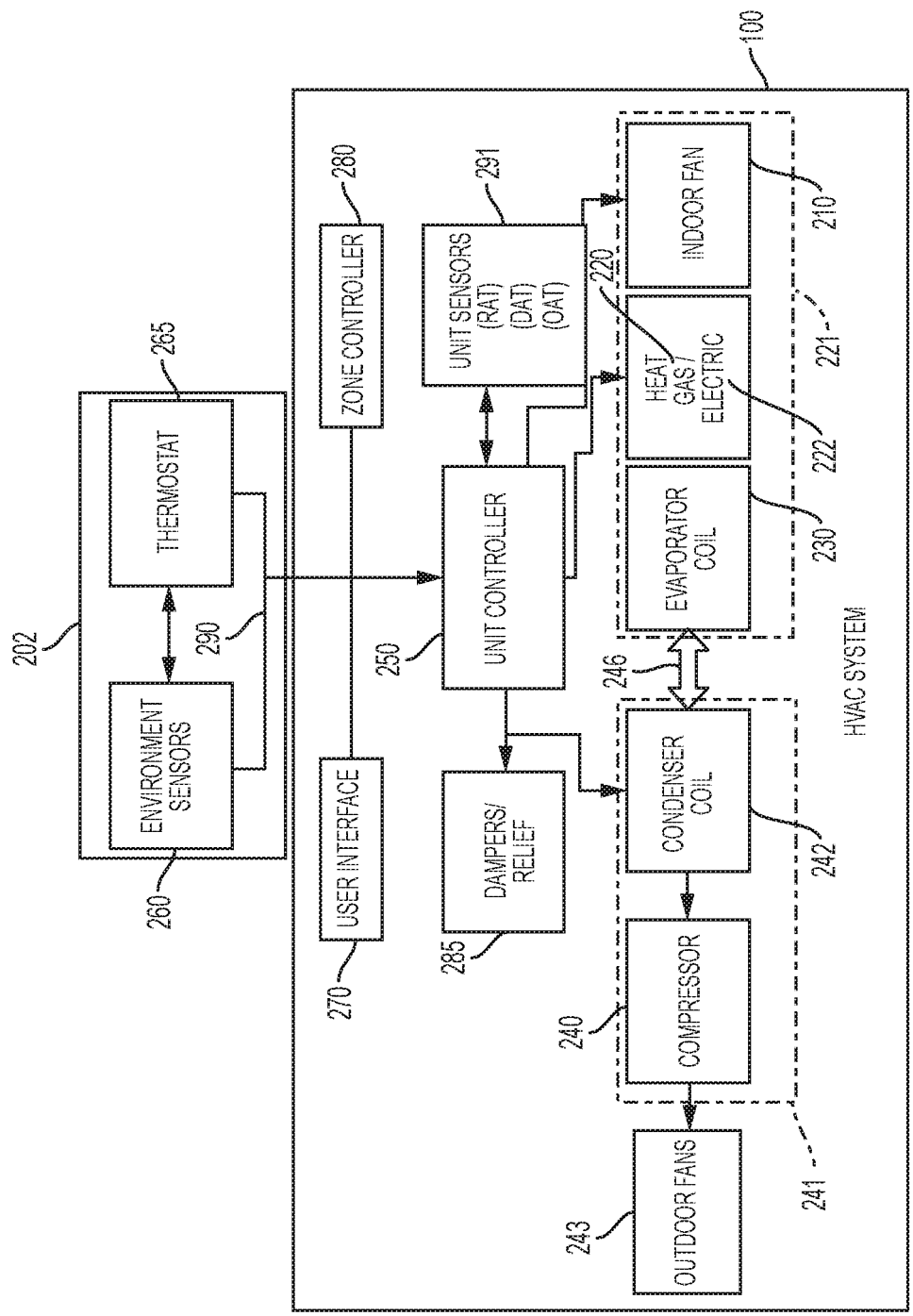
FIG. 1 illustrates an exemplary HVAC system.

FIG. 1 illustrates an exemplary HVAC system 100. The HVAC system 100 may be a networked HVAC system configured to condition air (e.g., heating, cooling, humidifying, or dehumidifying the air) within an enclosed space 202. The enclosed space 202 may be, for example, a house, an office building, a warehouse, a school, or the like. Thus, the HVAC system 100 can be a residential system or a commercial system such as, for example, a roof top system. For exemplary illustration, the HVAC system 100 as illustrated in FIG. 1 includes various components; however, in other embodiments, the HVAC system 100 may include additional components that are not illustrated, but typically included within HVAC systems.

The HVAC system 100 includes a circulation fan 210, gas heat 220, electric heat 222 typically associated with the circulation fan 210, and a refrigerant evaporator coil 230, also typically associated with the circulation fan 210. The circulation fan 210, the gas heat 220, the electric heat 222, and the refrigerant evaporator coil 230 may be collectively referred to as an "indoor unit" 221. The HVAC system 100 also includes a compressor 240, at least one outdoor fan 243, and an associated condenser coil 242, which may be typically referred to as an "outdoor unit" 241. The compressor 240 and the associated condenser coil 242 are typically connected to an associated evaporator coil 230 by a refrigerant line 246. The circulation fan 210, also referred to as a blower, is configured to operate at different capacities (i.e., operating speeds) to circulate air through the HVAC system 100, whereby the circulated air is conditioned and supplied to the enclosed space 202. In some embodiments, the HVAC system 100 may provide at least one of a variable-speed blower, a variable-speed compressor, a multi-stage blower, a multi-stage compressor, a multi-speed blower, and a multi-stage compressor.

The HVAC system 100 also includes an HVAC controller 250 that is configured to regulate an environment of the enclosed space 202 by controlling operations of the various components of the HVAC system 100. In some embodiments, the HVAC system 100 can be a zoned system. As such, the HVAC system 100 may also include a zone controller 280, dampers 285, a plurality of unit sensors 291 (e.g., a return-air-temperature sensor, a discharge-air-temperature sensor, an outside-air-temperature sensor), and a plurality of environment sensors 260. Accordingly, the HVAC controller 250 can also cooperate with the zone controller 280 and the dampers 285 to regulate the environment of the enclosed space 202. The HVAC system 100 includes at least one thermostat 265 for sensing the temperature of the enclosed space 202. In some embodiments, the HVAC controller 250 may include at least some of the functionality of the thermostat 265.

In some embodiments, the HVAC controller 250 includes an interface (illustrated in FIG. 2) to receive, for example, thermostat demand inputs, temperature setpoints, blower control signals, environmental information, and operating mode status for various zones of the HVAC system 100. For example, the environmental information includes temperature of the enclosed space 202, outdoor temperature, humidity, and the like. The HVAC controller 250 also includes a processor to direct the operation of the HVAC system 100. In some embodiments, the HVAC controller 250 may be the thermostat 265.

In some embodiments, the plurality of environment sensors 260 may be associated with the HVAC controller 250 and also optionally associated with a user interface 270. The plurality of environment sensors 260 are configured to measure and supply the environmental information within a zone or zones of the enclosed space 202 to the HVAC controller 250. The plurality of environment sensors 260 may also send the environmental information to a display of the user interface 270. In some embodiments, the user interface 270 provides additional functions such as, for example, operational, diagnostic, status message display, and a visual interface that allows at least one of an installer, user, a support entity, and a service provider to perform actions with respect to the HVAC system 100. In some embodiments, the user interface 270 may be, for example, the thermostat 265. In other embodiments, the user interface 270 may be associated with at least one of the plurality of environment sensors 260 to determine the environmental information and communicate the information to the user. The user interface 270 may also include a display, buttons, a microphone, a speaker, or other components to communicate with the user. As such, in some embodiments, the user interface 270 includes at least some of the functionality of the HVAC controller 250. In other embodiments, the user interface 270 may be, for example, a personal computer (e.g., desktop or laptop), tablet computer, mobile device (e.g., smart phone), and the like.

In a typical embodiment, the user interface 270 is configured to provide messages to a user. The messages may be, for example, a visual message, an audible message, and the like. In some embodiments, the user interface 270 may be an HVAC device such as, for example, the thermostat 265. In other embodiments, the user interface 270 may be a non-HVAC device having a primary function that is not associated with the HVAC system 100. For example, non-HVAC devices include mobile computing devices that are configured to interact with HVAC systems. Mobile computing devices may be, for example, a personal computer (e.g., desktop or laptop), tablet computer, mobile device (e.g., smart phone), and the like.

In embodiments with multiple zones, the zone controller 280 is configured to manage movement of the conditioned air to designated zones of the enclosed space 202. Each of the designated zones may include at least one conditioning or demand unit such as, for example, the gas heat 220 and at least one user interface 270 such as, for example, the thermostat 265. The HVAC system 100 may allow the user to independently control the temperature in the designated zones. The zone controller 280 operates electronic dampers 285 to control air flow to the designated zones of the enclosed space 265.

In some embodiments, a data bus 290, which in the illustrated embodiment is a serial bus, couples the various components of the HVAC system 100 together such that data may be communicated therebetween. In a typical embodiment, the data bus 290 includes any combination of hardware, software embedded in a computer readable medium, and/or encoded logic incorporated in hardware or otherwise stored (e.g., firmware) to couple components of the HVAC system 100 to each other. As an example and not by way of limitation, the data bus 290 may include an Accelerated Graphics Port (AGP) or other graphics bus, a front-side bus (FSB), a HYPERTRANSPORT (HT) interconnect, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. The data bus 290 may include any number, type, and/or configuration of buses 290, where appropriate. In particular embodiments, one or more buses 290 (which may each include an address bus and a data bus) may couple the HVAC controller 250 to other components of the HVAC system 100. In other embodiments, the connections between various components of the HVAC system 100 may be wired. For example, conventional cable and contacts may be used to couple the HVAC controller 250 to the various components. In some embodiments, a wireless connection may also be employed to provide at least some of the connections.

Figure 2:
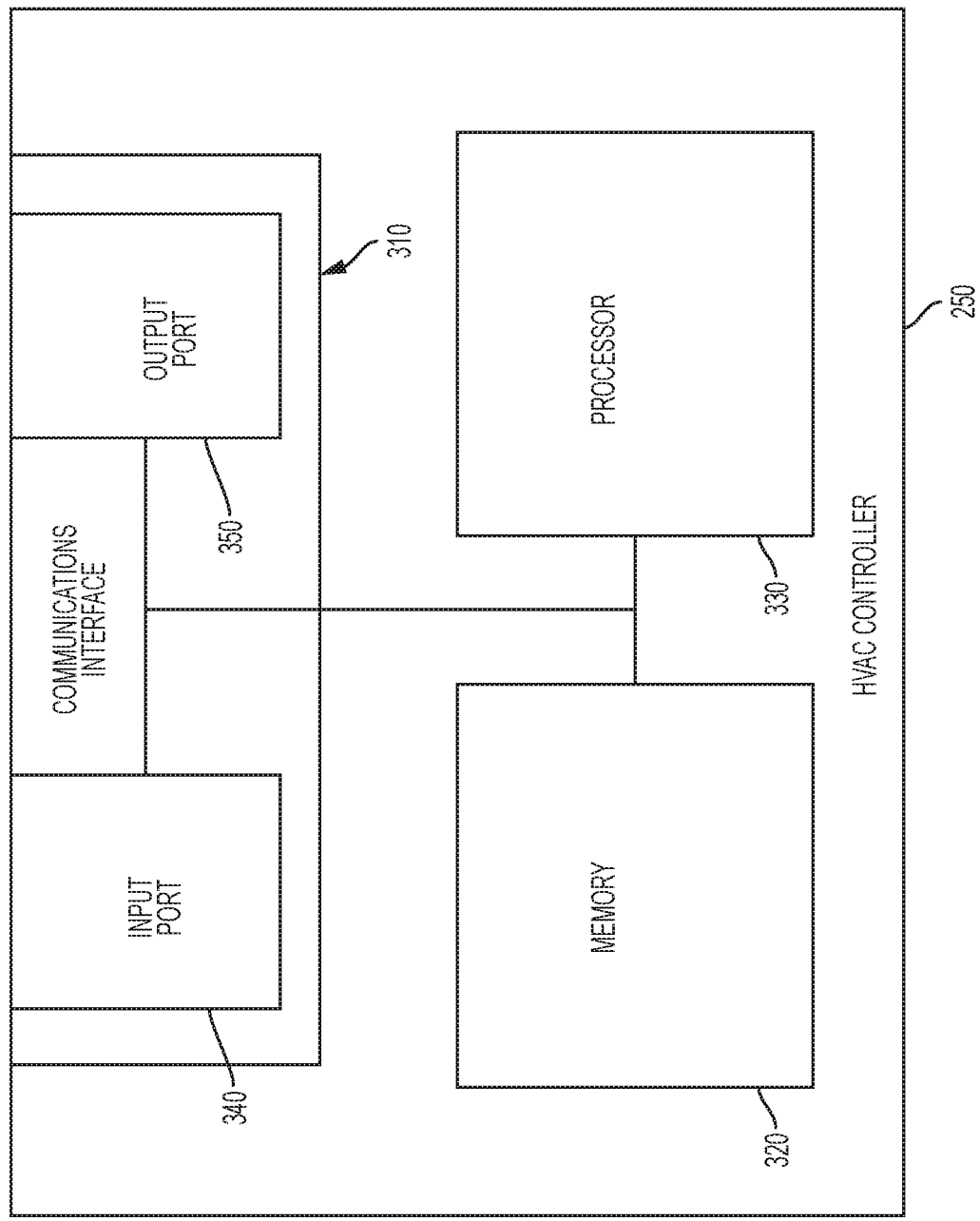
FIG. 2 is a schematic view illustrating processing circuitry of an exemplary controller of the HVAC system.

FIG. 2 is a schematic view illustrating processing circuitry of an exemplary controller 250 of the HVAC system 100. For illustrative purposes, the HVAC controller 250 will be described relative to FIGS. 1-2. The HVAC controller 250 is configured to control operations of the HVAC system 100. The HVAC controller 250 may include, for example, a communications interface 310, a memory 320, and a processor 330. The memory 320 may be a conventional memory. As a nonlimiting example, the memory 320 may be a non-volatile memory, flash memory, non-transitory memory or the like. The memory 320 is coupled to the communications interface 310 and may store operating instructions that direct operations of the processor 330. The operating instructions may represent control logic or algorithms, discussed in further detail herein, that are used by the processor 330 to direct operation and configuration of the HVAC system 100. The HVAC controller 250 may also include additional components typically included within controllers for HVAC systems such as, for example, a power supply, power port, and the like.

The communications interface 310 allows communication between the HVAC controller 250 and the HVAC system 100 and may be any suitable device for transmitting data to and receiving data from the various components of the HVAC system 100. In some embodiments, the communications interface 310 may include multiple ports such as, for example, an input port 340 and an output port 350. In other embodiments, the communications interface 310 may include a single, combined port. In some embodiments, the communications interface 310 allows the HVAC controller 250 to transmit operating instructions to various components of the HVAC system 100. The operating instructions may be, for example, control signals that control operation of, for example, the circulation fan 210, the compressor 240, the condenser coil 242, the electric heat 222, and other components of the HVAC system 100. In other embodiments, the communications interface 310 allows the HVAC controller 250 to receive data from various components of the HVAC system 100. The received data may be related to environmental conditions such as, for example, time, indoor temperature, outdoor temperature, humidity, and the like. In some embodiments, the thermostat 265 provides the data to the HVAC controller 250 via the communication interface 310.

In a typical embodiment, the thermostat 265 provides a thermostat demand input to the HVAC controller 250. The thermostat demand input may be a demand for the HVAC system 100 to condition the air. The thermostat demand input may be a cooling demand (e.g. $Y_1, Y_2 \ldots Y_n$) or a heating demand (e.g. $W_1, W_2 \ldots W_n$), where $Y_1 \ldots Y_n$ represents different cooling modes of the HVAC system 100 and $W_1 \ldots W_n$ represents different heating modes of the HVAC system 100. HVAC systems 265 that condition air using different cooling or heating modes typically use lower cooling or heating levels and only use higher cooling or heating levels for extreme weather days. In some embodiments, the HVAC controller 250 may operate, for example, at least one of the circulation fan 210 and the compressor 240 at different cooling modes (e.g. $Y_1, Y_2 \ldots Y_n$) or different heating modes (e.g. $W_1, W_2 \ldots W_n$) based on the thermostat demand input.

In some embodiments, the blower 210 or the compressor 240 of the HVAC system 100 may be at least one of a variable-speed blower, a variable-speed compressor, a multi-stage blower, a multi-stage compressor, a multi-speed blower, and a multi-speed compressor. The aforementioned compressors and blowers are capable of being operated at different speeds or modes. It is understood in the art that operating the blower 210 or compressor 240 at different 'modes' may represent operation at a set range of 'speeds'. For example, at a first cooling or heating mode (e.g., $Y_1$ or $W_1$), the blower 210 or the compressor 240 may operate at a speed of approximately 20-40 Hz. At a second cooling or heating mode (e.g., $Y_2$ or $W_2$), the blower 210 or the compressor 240 may operate at a speed of approximately 40-60 Hz. For purposes of clarity and brevity, the term 'speed' is used herein below to discuss operation of the blower 210 or compressor 240. However, it shall be understood that any discussion of adjustment of the 'speed' of the blower 210 or compressor 240 below also contemplates operating the blower 210 or compressor 240 in multiple modes. As such, embodiments below that discuss adjusting or controlling the 'speed' of the blower 210 or compressor 240 should also be interpreted as being capable of adjusting or controlling the 'mode' of the blower 210 or compressor 240.

In some embodiments, the HVAC controller 250 may be an integrated controller that is incorporated into the HVAC system 100. In other embodiments, the HVAC controller 250 may be a distributed controller that is positioned at a location remote from the HVAC system 100. In some embodiments, the speed of operation of at least one of the blower 210 and the compressor 240 is controlled by operating instructions provided by the HVAC controller 250. The operating instructions represent control logic or algorithms that direct the HVAC controller 250 according to the methods discussed further herein. In other embodiments, the thermostat 265 may include at least some of the functionality by sending signals to the HVAC controller and is capable of providing operating instructions for controlling the speed of operation of at least one of the blower 210 and the compressor 240.

Figure 3:
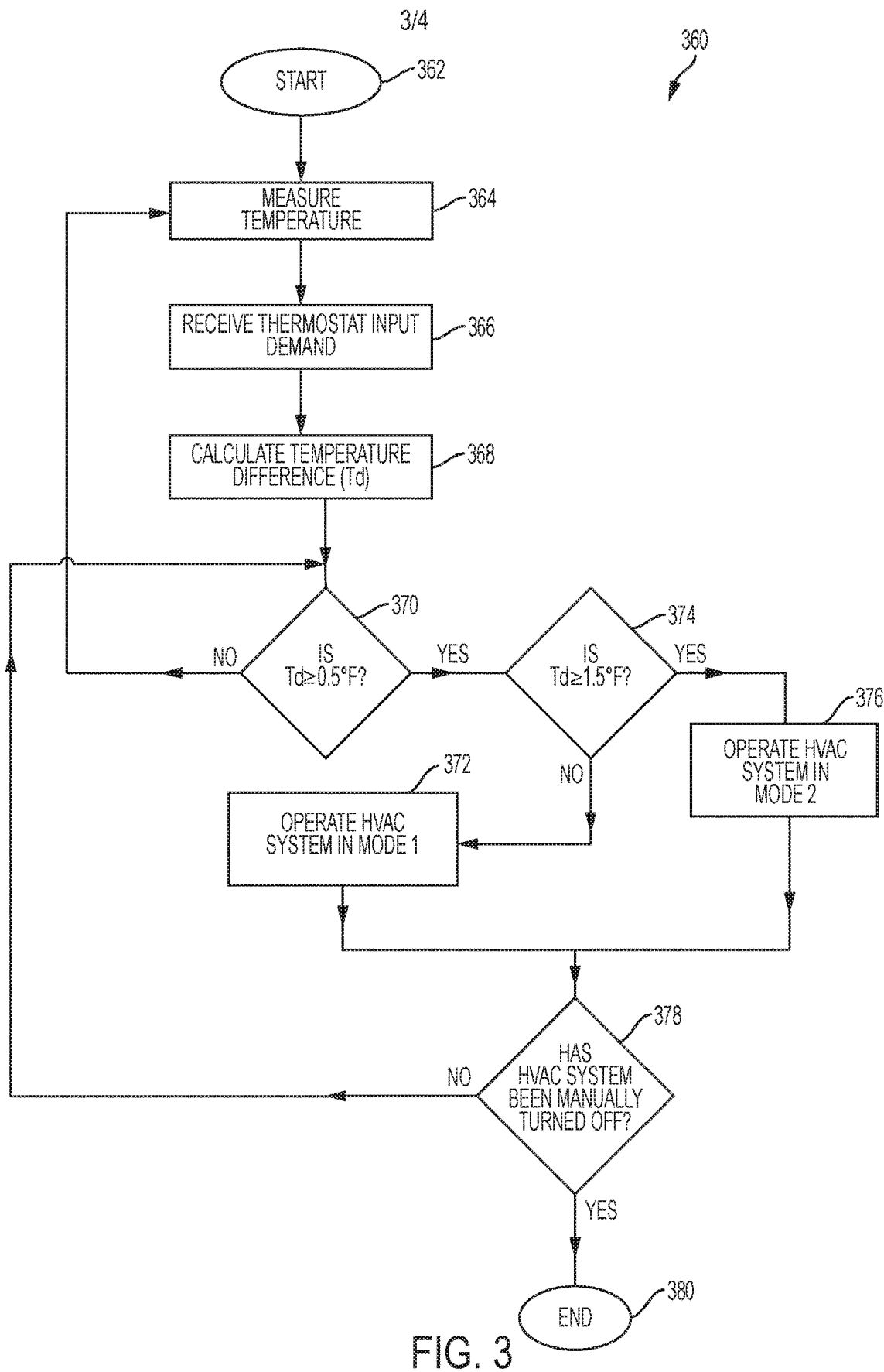
FIG. 3 is a flow chart illustrating an exemplary process for controlling operations of the HVAC system.

FIG. 3 is a flow chart illustrating a process 360 for controlling operations of the HVAC system 100. For illustrative purposes, the process 360 will be described relative to FIGS. 1-2. The process 360 starts at step 362. At step 364, current temperature of the enclosed space 202 is measured. At step 366, a thermostat demand input is received. The thermostat demand input may be a demand for the HVAC system 100 to condition the air within the enclosed space 202 to a setpoint temperature. For purpose of this patent application, a setpoint or temperature setpoint refers to a target temperature setting of the HVAC system 100 as set by a user or automatically based on a pre-defined schedule. The thermostat demand input may be a cooling demand (e.g. $Y_1, Y_2 \ldots Y_n$) or a heating demand (e.g. $W_1, W_2 \ldots W_n$), where $Y_1 \ldots Y_n$ represents different cooling modes of the HVAC system 100 and $W_1 \ldots W_n$ represents different heating modes of the HVAC system 100. At step 368, temperature difference ($T_d$) between the current temperature of the enclosed space 202 and the setpoint temperature is calculated. For example, if the current temperature of the enclosed space 202 is 72° F. and the setpoint temperature is 76° F., the temperature difference $T_d$ is 4° F. In a typical embodiment, the HVAC controller 250 is configured to select an operating mode of the HVAC system 100 from at least two operating modes based on $T_d$.

At step 370, it is determined if $T_d$ is greater than or equal to a first predetermined temperature differential value. In a typical embodiment, the first predetermined temperature differential is set by a manufacturer. In one embodiment, the first predetermined temperature differential value may be set to 0.5° F.; however, in other embodiments, the first predetermined temperature differential value may be set to any value as dictated by design requirements. If it is determined at step 370 that $T_d$ is less than 0.5° F., the process 360 returns to step 364. However, if it is determined at step 370 that $T_d$ is greater than or equal to 0.5° F., the process 360 proceeds to step 374. At step 374, it is determined if $T_d$ is greater than or equal to a second predetermined temperature differential value. In a typical embodiment, the second predetermined temperature differential is set by a manufacturer. In one embodiment, the second predetermined temperature differential value may be set to 1.5° F.; however, in other embodiments, the second predetermined temperature differential value may be set to any value as dictated by design requirements. If it is determined at step 374 that $T_d$ is less than 1.5° F., the process 360 proceeds to step 372. At step 372, the HVAC controller 250 sets the HVAC system 100 to operate in the first cooling or heating mode (e.g., $Y_1$ or $W_1$). For example, at the first cooling or heating mode (e.g., $Y_1$ or $W_1$), at least one of the blower 210 and the compressor 240 may operate at a speed of approximately 20-40 Hz.

However, if it is determined at step 374 that $T_d$ is greater than or equal to 1.5° F., the process 360 proceeds to step 376. At step 376, the HVAC controller 250 sets the HVAC system 100 to operate in the second cooling or heating mode (e.g., $Y_2$ or $W_2$). For example, at the second cooling or heating mode (e.g., $Y_2$ or $W_2$), at least one of the blower 210 and the compressor 240 may operate at a speed of approximately 40-60 Hz. From steps 372 and 376, the process 360 proceeds to step 378. At step 378, it is determined if the HVAC system 100 has been manually turned off. If it is determined at step 378 that the HVAC system 100 has not been manually turned off, the process 360 proceeds to step 370. However, if it is determined at step 378 that the HVAC system 100 has been manually turned off, the process 360 ends at step 380.

For illustrative purposes, only two modes of operation of the HVAC system 100 are discussed relative to FIG. 3. However, in some embodiments, at least one additional mode of operation of the HVAC system 100 may be further provided in addition to the first and second modes discussed above. In some embodiments, the various modes of operation of the HVAC system 100 may be associated with a desired level of adjustability. The level of adjustability sets a predetermined operating range for at least one of the blower 210 and the compressor 240. As a nonlimiting example, in the first cooling or heating mode (e.g., $Y_1$ or $W_1$), at least one of the blower 210 and the compressor 240 may operate with 50% adjustability. At the first cooling or heating mode (e.g., $Y_1$ or $W_1$), at least one of the blower 210 and the compressor 240 may operate at a speed of approximately 20-40 Hz. In the second cooling or heating mode (e.g., $Y_2$ or $W_2$), at least one of the blower 210 and the compressor 240 may operate with 100% adjustability. For example, at the second cooling or heating mode (e.g., $Y_2$ or $W_2$), at least one of the blower 210 and the compressor 240 may operate at a speed of approximately 40-60 Hz. In other embodiments, the at least one additional cooling or heating mode may comprises a combination of the first and second cooling or heating modes (e.g., $Y_1+Y_2$ or $W_1+W_2$).

In some embodiments, the HVAC controller 250 may adjust a level of adjustability of the HVAC system 100 at predetermined time intervals. In a typical embodiment, the predetermined time intervals are set by the manufacturer. In one embodiment, the predetermined time intervals may be set at five minutes; however, in other embodiments, the predetermined time intervals may be set to any value as dictated by design requirements. As such, at every five minute interval, the HVAC controller 250 may either increase or decrease the adjustability of the HVAC system 100 by a predetermined amount. For example, in the first or second mode of operation, the HVAC system 100 may start at an initial adjustability level and increase or decrease the adjustability level at a fixed rate in accordance with the predetermined time intervals.

Figure 4:
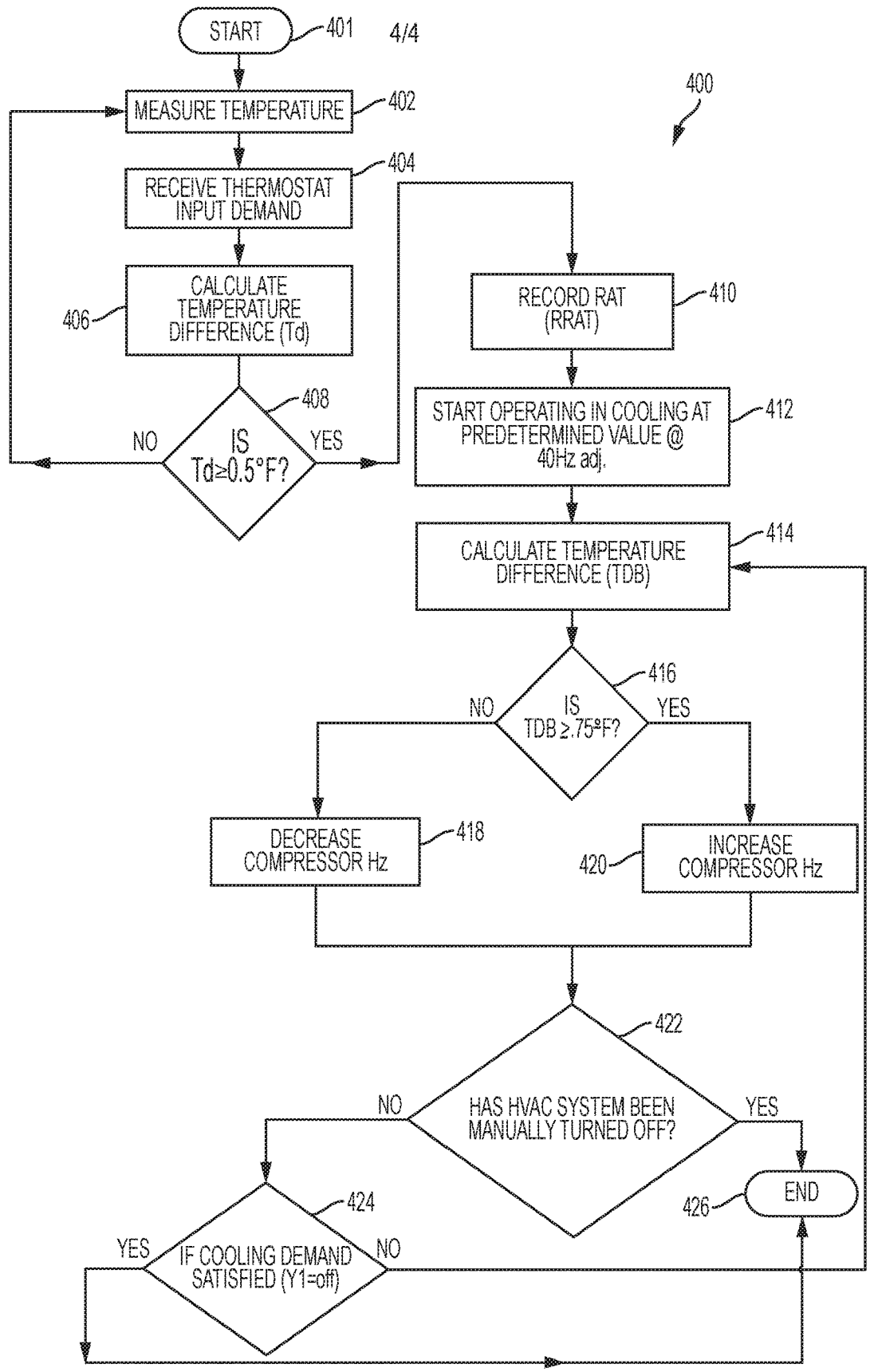
FIG. 4 is a flow chart illustrating an exemplary process for controlling operations of the HVAC system.

FIG. 4 is a flow chart illustrating a process 400 for controlling operations of the HVAC system 100. For illustrative purposes, the process 400 will be described relative to FIGS. 1-2. The process 400 starts at step 401. At step 402, current temperature of the enclosed space 202 is measured. At step 404, a thermostat demand input is received. The thermostat demand input may be a demand for the HVAC system 100 to condition the air within the enclosed space 202 to a setpoint temperature. The thermostat demand input may be a cooling demand (e.g. $Y_1, Y_2 \ldots Y_n$) or a heating demand (e.g. $W_1, W_2 \ldots W_n$), where $Y_1 \ldots Y_n$ represents different cooling modes of the HVAC system 100 and $W_1 \ldots W_n$ represents different heating modes of the HVAC system 100. At step 406, temperature difference $(T_d)$ between the current temperature of the enclosed space 202 and the setpoint temperature is calculated.

At step 408, it is determined if $T_d$ is greater than or equal to a first predetermined temperature differential value. In a typical embodiment, the first predetermined temperature differential is set by a manufacturer. In one embodiment, the first predetermined temperature differential value may be set to 0.5° F.; however, in other embodiments, the first predetermined temperature differential value may be set to any value as dictated by design requirements. If it is determined at step 408 that $T_d$ is less than 0.5° F., the process 400 returns to step 402. However, if it is determined at step 408 that $T_d$ is greater than or equal to 0.5° F., the process 400 proceeds to step 410. At step 410, return air temperature (RAT) is recorded using at least one of the plurality of unit sensors 291 such as, for example, the return-air-temperature sensor. The recorded return air temperature is referred hereto at (RRAT). From step 410, the process 400 proceeds to step 412. At step 412, the at least one of the blower 210 and the compressor 240 may operate in a cooling mode at a speed of approximately 40 Hz. From step 412, the process 400 proceeds to step 414.

At step 414, temperature difference (TDB) between the recorded return air temperature (RRAT) and the return air temperature (RAT) is calculated. At step 416, it is determined if TDB is greater than or equal to a second predetermined temperature differential value. In a typical embodiment, the second predetermined temperature differential is set by a manufacturer. In one embodiment, the second predetermined temperature differential value may be set to 0.75° F.; however, in other embodiments, the second predetermined temperature differential value may be set to any value as dictated by design requirements. If it is determined at step 416 that TDB is less than 0.75° F., the process 400 proceeds to step 418. At step 418, the HVAC controller 250 provides instructions to the HVAC system 100 to operate the compressor at a speed lower than 40 Hz. However, if it is determined at step 416 that TDB is greater than or equal to 0.75° F., the process 400 proceeds to step 420. At step 420, the HVAC controller 250 provides instructions to the HVAC system 100 to operate the compressor at a speed higher than 40 Hz. From steps 418 and 420, the process 400 proceeds to step 422. At step 422, it is determined if the HVAC system 100 has been manually turned off. If it is determined at step 422 that the HVAC system 100 has been manually turned off, the process 400 ends at step 426. However, if it is determined at step 422 that the HVAC system 100 has not been manually turned off, the process 400 proceeds to step 424. At step 424, it is determined if the thermostat demand input is satisfied. If it is determined at step 424 that the thermostat demand input TDB is not satisfied, the process 400 returns step 414. However, if it is determined at step 424 that the thermostat demand input TDB is satisfied, the process 400 ends at step 426.

For purposes of this patent application, the term computer-readable storage medium encompasses one or more tangible computer-readable storage media possessing structures. As an example and not by way of limitation, a computer-readable storage medium may include a semiconductor-based or other integrated circuit (IC) (such as, for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of the processor 320, one or more portions of the system memory 330, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

In this patent application, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Python, Java, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

The invention claimed is:

1. A heating, ventilation, and air conditioning (HVAC) system comprising:
　an interface configured to communicate with a controller that comprises at least one of a memory and a processor and a plurality of environmental sensors;
　wherein the controller is configured to:
　　communicate with at least one environmental sensor of the plurality of environmental sensors, wherein the at least one environmental sensor is configured to measure current temperature within an enclosed space;
　　receive, via the interface, a demand to condition air within the enclosed space to a target temperature;
　　calculate a temperature difference between the measured current temperature and the received demand;
　　determine whether the temperature difference between the measured current temperature and the received demand is greater than or equal to a first predetermined temperature differential value;
　responsive to a determination that the temperature difference between the measured current temperature and the received demand is greater than or equal to the first predetermined temperature differential value, determine, whether the temperature difference between the measured current temperature and the received demand is greater than or equal to a second predetermined temperature differential value; and
　responsive to a determination that the temperature difference between the measured current temperature and the received demand is less than the second predetermined temperature differential value, operate, at a first range of operating speeds, at least one of a blower and compressor of the HVAC system.

2. The HVAC system of claim 1, wherein the first range of operating speeds comprises operation at approximately 20-40 Hz.

3. The HVAC system of claim 2, wherein the first predetermined temperature differential value is approximately 0.5° F.

4. The HVAC system of claim 1, wherein the controller is further configured to:
　responsive to a determination that the temperature difference between the measured current temperature and the received demand is less than the first predetermined temperature differential value, return to measure the temperature.

5. The HVAC system claim 1, wherein the controller is further configured to:
responsive to a determination that the temperature difference between the measured current temperature and the received demand is greater than or equal to the second predetermined temperature differential value, operate, at a second range of operating speeds, at least one of the blower and the compressor of the HVAC system.

6. The HVAC system of claim 5, wherein the second range of operating speeds comprises operation at approximately 40-60 Hz.

7. The HVAC system of claim 6, wherein the second predetermined temperature differential value is approximately 1.5° F.

8. The HVAC system of claim 1, wherein the demand comprises at least one of a cooling demand and heating demand.

9. A method of controlling operations of a heating, ventilation, and air conditioning (HVAC) system, the method comprising:
utilizing a plurality of environmental sensors associated with a controller that comprises at least one of a communication interface, a memory, and a processor to complete the following:
measuring, using at least one environmental sensor of the plurality of environmental sensors, current temperature within an enclosed space;
receiving, using the communication interface, a demand to condition air within the enclosed space to a target temperature;
calculating, using the controller, a temperature difference between the measured current temperature and the received demand;
determining, using the controller, whether the temperature difference between the measured current temperature and the received demand is greater than or equal to a first predetermined temperature differential value;
responsive to a determination that the temperature difference between the measured current temperature and the received demand is greater than or equal to the first predetermined temperature differential value, determining, using the controller, whether the temperature difference between the measured current temperature and the received demand is greater than or equal to a second predetermined temperature differential value; and
responsive to a determination that the temperature difference between the measured current temperature and the received demand is greater or equal to the second predetermined temperature differential value, operating, at a second range of operating speeds, at least one of the blower and the compressor of the HVAC system.

10. The method of claim 9, wherein the second range of operating speeds comprises operation at approximately 40-60 Hz.

11. The method of claim 10, wherein the second predetermined temperature differential value is approximately 1.5° F.

12. The method of claim 9 further comprising:
responsive to a determination that the temperature difference between the measured current temperature and the received demand is less than the first predetermined temperature differential value, repeating the measuring step.

13. The method of claim 9 further comprising:
responsive to a determination that the temperature difference between the measured current temperature and the received demand is less than the second predetermined temperature differential value, operating, at a first range of operating speeds, at least one of the blower and the compressor of the HVAC system.

14. The method of claim 13, wherein the first range of operating speeds comprises operation at approximately 20-40 Hz.

15. The method of claim 14, wherein the first predetermined temperature differential value is approximately 0.5° F.

16. A heating, ventilation, and air conditioning (HVAC) system comprising:
an interface configured to communicate with a controller that comprises at least one of a memory and a processor and a plurality of environmental sensors;
wherein the controller is configured to:
communicate with at least one environmental sensor of the plurality of environmental sensors, wherein the at least one environmental sensor is configured to measure current temperature within an enclosed space;
receive, via the interface, a demand to condition air within the enclosed space to a target temperature;
calculate a temperature difference between the measured current temperature and the received demand;
determine whether the temperature difference between the measured current temperature and the received demand is greater than or equal to a first predetermined temperature differential value;
responsive to a determination that the temperature difference between the measured current temperature and the received demand is greater than or equal to the first predetermined temperature differential value, determine, whether the temperature difference between the measured current temperature and the received demand is greater than or equal to a second predetermined temperature differential value; and
responsive to a determination that the temperature difference between the measured current temperature and the received demand is greater than the second predetermined temperature differential value, operate, at a second range of operating speeds, at least one of the blower and the compressor of the HVAC system.

17. The HVAC system of claim 16, wherein:
the second range of operating speeds comprises operation at approximately 40-60 Hz; and
the second predetermined temperature differential value is approximately 1.5° F.

18. The HVAC system of claim 16, wherein the controller is further configured to:
responsive to a determination that the temperature difference between the measured current temperature and the received demand is less than the second predetermined temperature differential value, operate, at a first range of operating speeds, at least one of the blower and the compressor of the HVAC system.

19. The HVAC system of claim 18, wherein:
the first range of operating speeds comprises operation at approximately 20-40 Hz; and the first predetermined temperature differential value is approximately 0.5° F.

* * * * *